United States Patent [19]

Ohlenforst et al.

[11] Patent Number: 4,775,570

[45] Date of Patent: Oct. 4, 1988

[54] GLASS PANE WITH PUSHED-ON PROFILE STRIP IN THE EDGE REGION

[75] Inventors: Hans Ohlenforst, Aachen; Gerd-Ulrich Cornils, Merzenich-Girbelsrath, both of Fed. Rep. of Germany

[73] Assignee: Saint-Gobain Vitrage, Courbevoie, France

[21] Appl. No.: 55,929

[22] Filed: Jun. 1, 1987

[30] Foreign Application Priority Data

May 30, 1986 [DE] Fed. Rep. of Germany ....... 3618278

[51] Int. Cl.[4] .......................... B32B 3/06; E06B 7/16
[52] U.S. Cl. ....................... 428/83; 49/488; 49/490; 52/397; 52/403; 52/823; 428/122; 428/192; 428/358
[58] Field of Search ............ 52/397, 403, 823; 49/490, 438, 488; 428/34, 83, 122, 192, 194, 358

[56] References Cited

U.S. PATENT DOCUMENTS

| | | | |
|---|---|---|---|
| 3,416,282 | 12/1968 | Daugherty | 52/823 X |
| 3,779,794 | 12/1973 | De Santis | 428/457 X |
| 4,443,508 | 4/1984 | Mehl | 428/192 X |
| 4,448,835 | 5/1984 | Yamaguchi | 428/122 X |
| 4,477,507 | 10/1984 | Kunert | 428/122 X |
| 4,480,417 | 11/1984 | Evers | 428/83 X |
| 4,539,243 | 9/1985 | Miller | 428/34 X |
| 4,551,372 | 11/1985 | Kunert | 428/38 |
| 4,555,607 | 11/1985 | Roentgen et al. | 156/273.9 X |
| 4,571,278 | 2/1986 | Kunert | 156/108 |
| 4,582,738 | 4/1986 | Kunert | 428/80 |
| 4,603,899 | 8/1986 | Iwasa | 428/122 X |
| 4,606,159 | 8/1986 | Kunert | 52/400 X |
| 4,668,556 | 5/1987 | Hermann et al. | 428/358 X |
| 4,681,794 | 7/1987 | Kunert et al. | 428/188 |
| 4,704,175 | 11/1987 | Kunert et al. | 156/108 |
| 4,712,331 | 12/1987 | Fujiwara | 49/488 |

FOREIGN PATENT DOCUMENTS

2006309 5/1979 United Kingdom ............... 428/122

*Primary Examiner*—Henry F. Epstein
*Attorney, Agent, or Firm*—Oblon, Fisher, Spivak, McClelland & Maier

[57] ABSTRACT

A glass pane is furnished at the edge with a profile having a U-section clamping portion. The glass pane is also furnished, in the edge zone covered by the U-section clamping portion of the profile, with a facing firmly adhering to the glass surface and having a profiled surface. The U-shaped clamping portion of the profile possesses, on the surface bearing against the facing, a profiling corresponding to the profiling of the facing, in such a manner that a form-fitting connection is obtained between the arms of the U-section clamping portion and the profiled facing.

11 Claims, 5 Drawing Sheets

GLASS PANE WITH PUSHED-ON PROFILE STRIP IN THE EDGE REGION

BACKGROUND OF THE INVENTION

1. Field of the Invention

This invention relates to a glass pane which is furnished, at the edge, with a pushed-on profile strip of U-shaped cross-section or with a surrounding profile frame of a resiliently elastic material. It relates especially to an automobile glass pane furnished with a peripheral, pushed-on frame, which is intended for directly bonding onto the mounting flange of the window opening of an automobile body.

2. Background of the Related Art

Glass panes may be furnished with pushed-on profiles for various purposes. For example, pushed-on profiles may serve as an edge protecting profile for the sensitive edges of the pane, or for purely aesthetic reasons for framing a glass pane. Pushed-on profiles having various cross-sections are finding increased use in the case of automobile panes. Such profiles or profile frames may serve directly for mounting the glass panes in the window frame. When the fixing of the glass panes in the window frame takes place by direct bonding to the window frame, a profile frame is usually fitted to the edge of the glass pane in order to furnish the glass pane with a frame and to cover over the gap between the edge of the glass pane and the window frame.

In the case of pushed-on profiles having a U-shaped mounting portion, it is frequently difficult to obtain a permanent and enduring mounting on the edge of the glass pane. Profile strips or frames of rubber-elastic material are therefore frequently fixed onto the glass pane by placing additional adhesive between. Where metallic pushed-on profiles are used, it is also known to improve the force-transmitting mounting of the clamping profile by furnishing the glass surface with an adhesive facing of a highly elastic polymer, by which the bonding friction is substantially increased.

SUMMARY OF THE INVENTION

The object of this invention is to achieve a substantial improvement in the bonding of clamping and push-on profiles having a U-section clamping portion, especially in those cases in which, due to the material of which the profiles are made, only inadequate clamping forces are exerted. In particular, the necessity for additional gluing must be avoided so that the push-on profile can again be removed, if necessary, from the glass pane.

According to the invention this object is achieved in that, in the edge zone covered by the clamping portion of the profile strip, a facing firmly adhering to the glass pane and having a profiled surface is provided on at least one face of the glass pane, and that the U-section is provided on at least one face of the glass pane, and that the U-section clamping portion of the profile strip is furnished on the surface bearing against the facing with a profile corresponding to the profiling of the facing, in such a manner that a form-fitting connection is obtained between the profiled arms of the U-section clamping portion which bear against the glass pane and the profiled facing.

In an advantageous further embodiment of the invention, the glass pane is furnished on both sides with a firmly bonding profiled facing, and both the arms of the U-section clamping portion of the profile strip possess a corresponding profiling.

The profiling of the facing adhering to the glass surface comprises at least one rib extending parallel to the edge of the glass pane and having an approximately sawtooth shape in cross-section.

By the profiling of the facing on the glass pane provided by this invention and of the arms of the clamping profile portion, mutually engaging and, possibly, back-out surface structures are formed, which mesh with one another, so that the push-on profiles themselves sit extremely securely on the edge of the glass pane even when only relatively small clamping forces are applied by the clamping profile.

BRIEF DESCRIPTION OF THE DRAWINGS

A more complete appreciation of the invention and many of the attendant advantages therof will be readily obtained as the same becomes better understood by reference to the following detailed description when considered in connection with the accompanying drawings, wherein.

DETAILED DESCRIPTION OF THE PREFERRED EMBODIMENTS

Figure 1:
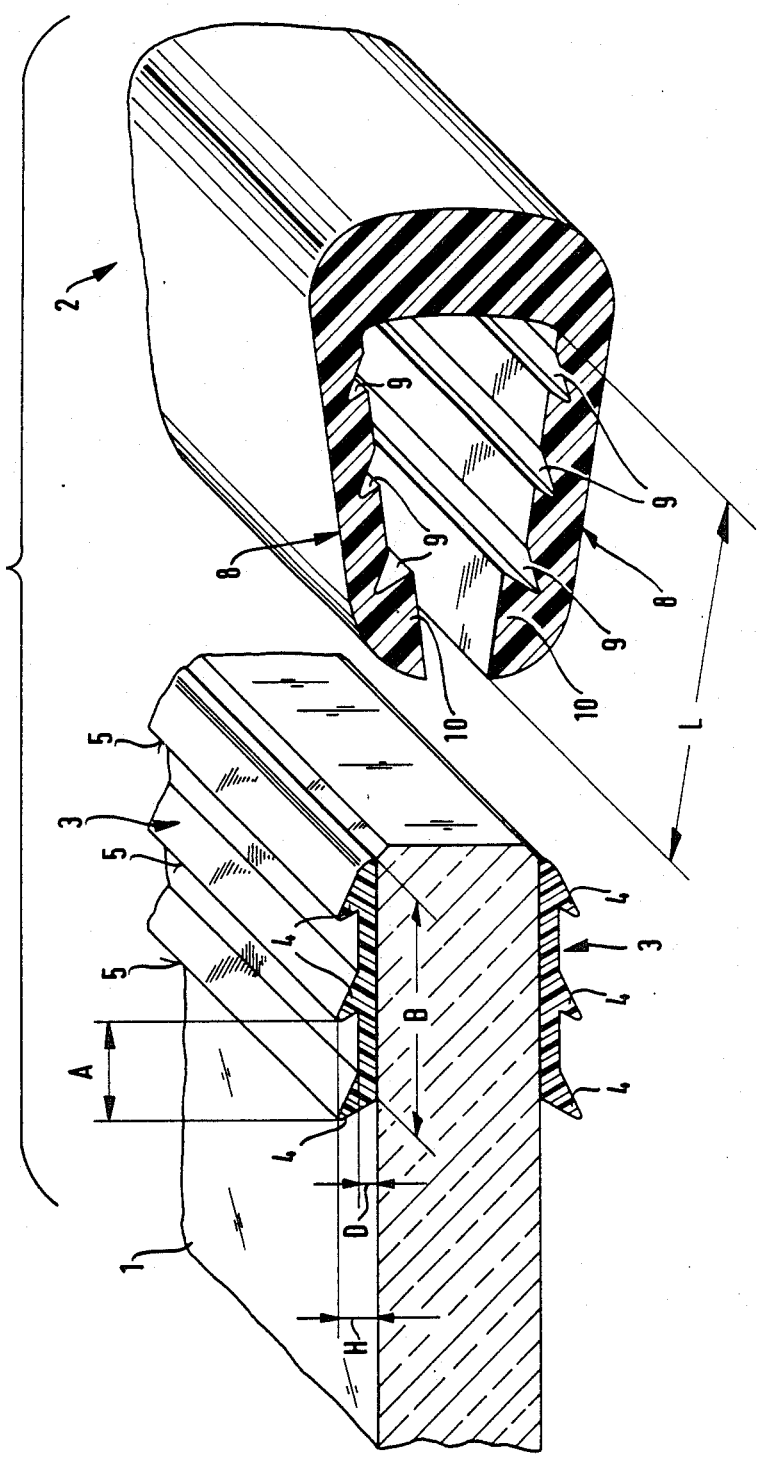
FIG. 1 shows the edge region of a monolithic glass pane having a facing formed according to this invention
Figure 2:
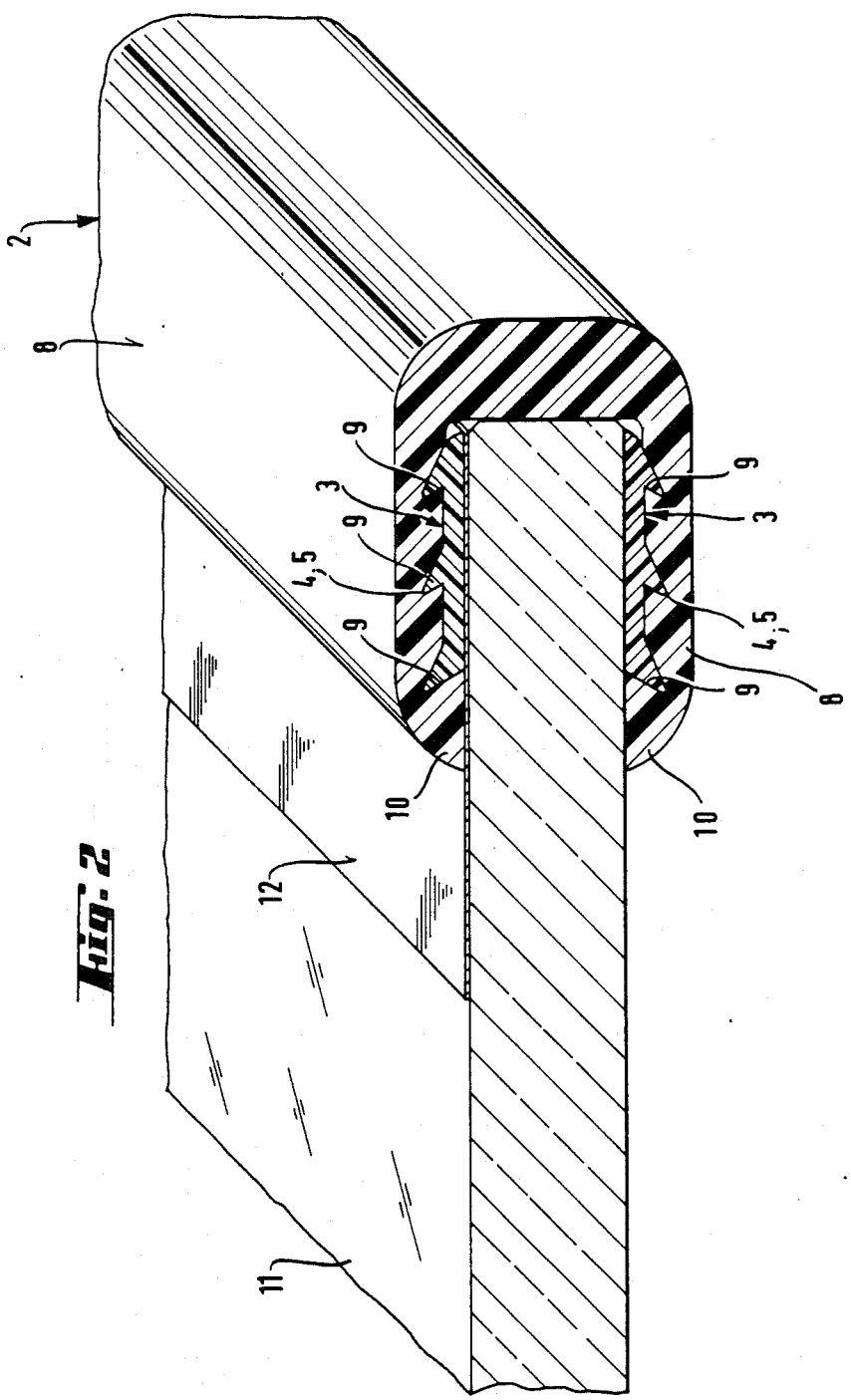
FIG. 2 shows the edge region of a monolithic glass pane having a push-on profile formed according to this invention.

The glass panes 1, 11 illustrated in FIGS. 1 and 2 are monolithic silicate glass panes, which are to be furnished (FIG. 1) or have been furnished (FIG. 2) along one edge or along their entire periphery with a pushed-on clamping profile 2. The clamping profile 2 may be a profile strip of a profile frame of an appropriate plastic material. The clamping profile may be of a hard or soft plastic and, for example, may also be of a rubber-elastic plastic material such as EPDM which is commonly used for framing and mounting of automobile glass panes.

The glass pane 1, 11 is equipped, in its edge region over a width B which is somewhat smaller than the length L of the arms of the clamping profile 2, with a firmly adhering, profiled facing 3. In the example illustrated, the facing 3 is provided on both surfaces of the glass pane 1, 11, but it is also possible to provide the profiled facing 3 only on one surface of the glass pane 1, 11.

The facing 3 has, in cross-section, an approximately sawtooth-shaped profile. In the case shown, the facing 3 possesses, as seen in cross-section, three sawtooth-shaped projections 4, which constitute ribs 5 extending parallel to the edge of the glass pane. The ribs 5 have a mutual spacing A of 1 to 5 mm. The sawtooth-shaped ribs 5 are slightly inclined towards the interior of the pane surface, so that they constitute especially effective anchorage facilities for the push-on profile. The thickness D of the basic layer of the facing 3 is, for example, about 0.5 to 1 mm, whereas the height H of the ribs 5 is about 1 to 2 mm, measured from the surface of the glass.

In the drawings, the anchoring ribs 5 are shown with a comparatively sharply tapering edge, so that they have a pronounced sawtooth shape. The ribs 5 are, however, just as effective if the edges are rounded to a greater or lesser extent. The grooves 9 in the profile strips 2, corresponding to the ribs 5 and constituting with them the form-fitting connection, may also possess correspondingly rounded edges.

As a material for the profiled facing 3, extrudable adhesive compounds, which bond well to the glass pane 1 and which retain the profiled structure after the application and hardening of the adhesive compound, are suitable. Good results are obtained with two-component polyurethane adhesives, as are described together with suitable primer compositions in U.S. Pat. No. 3,779,794. These adhesive compounds can be applied without difficulty onto the edge zone of the glass pane with the help of a suitably profiled extruder nozzle, the simultaneous application of the two facings 3 onto the two opposite glass surfaces by means of a single, appropriately shaped extruder nozzle being also readily possible.

Depending upon the hardening material used for the facing 3, a pre-treatment of the glass surface, especially cleaning and/or primer application, is necessary or advisable, known materials sometimes specified for the various adhesive compounds being used for this purpose.

The clamping profile 2 is shown as a U-section profile, but it may of course have any other cross-section forms, provided that it has a portion which is U-shaped in cross-section, by which it can be pushed-on and clamped onto the edge zone of the glass pane. It may be made of any material, the only requirement being that the material possess a certain minimum spring elasticity and shape retention, so that the arms of the clamping profile will not bend apart. Plastics of a wide variety of types are particularly suitable. If rubber-elastic materials such as EPDM or other synthetic rubbers or rubber-elastic polymers which, due to their rubber-elastic properties, also fulfill sealing functions with respect to adjacent frames or components are used, such profile strips or frames may also be furnished with a metal reinforcement, which imparts to the clamping profile components the necessary spring elasticity.

The profile strips 2 are preferably manufactured by extrusion. The arms 8 are furnished on their inner faces with profiles such as groove-shaped recesses 9, which correspond in their cross-section to the cross-section of the ribs 5 of the facing 3. At the forward end, the arms 8 are furnished with a sealing lip 10 which bears directly against the surface of the glass pane 1 beyond the facing 3. The groove-shaped recesses 9 are so oriented and back-cut that the pushing-up of the profile strip 2 onto the edge region of the glass pane can be carried out relatively easily, due to the ribs 5 being inclined in the same direction, whereas if an attempt is made to pull the profile strip off the glass pane, the barb-shaped ribs 5 firmly hook into the recesses 9 of the profile strip.

Whereas the glass pane 1 illustrated in FIG. 1 is suitable, when it has pushed thereonto the profile strip 2, for all purposes in which a pane having an edge protecting profile is required, FIG. 2 shows a glass pane 11, which is suitable especially for the fixed glazing, for example, of an automobile body by direct bonding. In the case of this glass pane 11, there is disposed on one surface of the glass pane, especially that surface which comes into contact with the adhesive compound, an opaque, frame-like coating 12 of a baked lacquer or other paint which firmly bonds to the glass surface, applied along the periphery of the glass pane in its edge region to a width, for example, of a few centimeters. This coating 12 serves for covering the adhesive coating and protecting it from solar radiation and UV rays. The construction of the profiled facing 3 and of the clamping profile 2 corresponds to the embodiment described with reference to FIG. 1.

Figure 3:
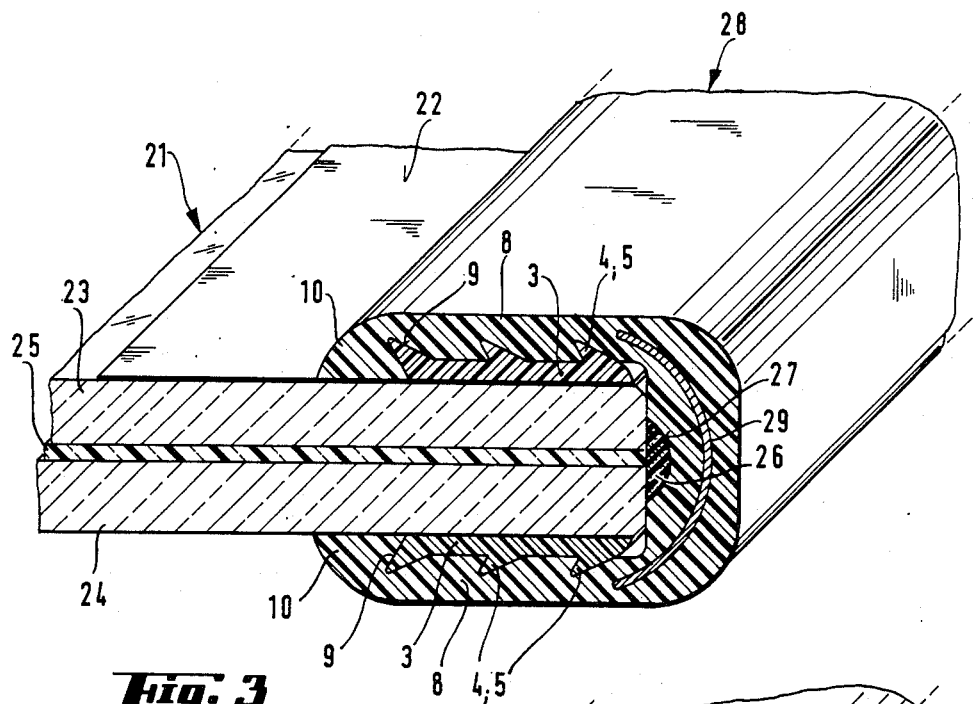
FIG. 3 shows the edge region of a composite glass pane having a push-on profile formed according to this invention and with additional sealing of the composite glass pane at the edge.

FIG. 3 also shows an embodiment which is suitable for use as an automobile glass pane. The glass pane 21 is, in this case, a composite glass pane, which consists of the two individual glass panes 23, 24 and a plastic layer 25 of polyvinyl butyral bonding these two glass panes together. In order to protect the polyvinyl butyral layer 25 from possible penetrating moisture, the composite glass pane 21 is sealed peripherally at its edge by a sealing compound 26. The sealing compound 26 is introduced, for example, in the form of a butyl cord into a peripheral recess 27 on the inside of the central web of the profile frame. When the profile frame 28 is pushed onto the edge zone of the glass pane 21, the butyl cord is pressed flat and bears sealingly against the peripheral surface of the two glass panes 23, 24, thus sealing the polyvinyl butyral layer 25. The composite glass pane 21 also possesses in its edge zone a peripheral, frame-like coating 22 of a paint impermeable to radiation, especially a baked lacquer paint. The profiled facing 3 on the composite glass pane 21 corresponds in its construction to the profile facing 3 described in relation to FIG. 1, and the same applies to the internal profiling of the two arms of the profile frame 28, cooperating with this facing 3, which act form-fittingly with the facing 3. The profile frame 28 is equipped with a metal inlay 29, which ensures the required bearing pressure of the arms of the profile frame 28.

Figure 4:
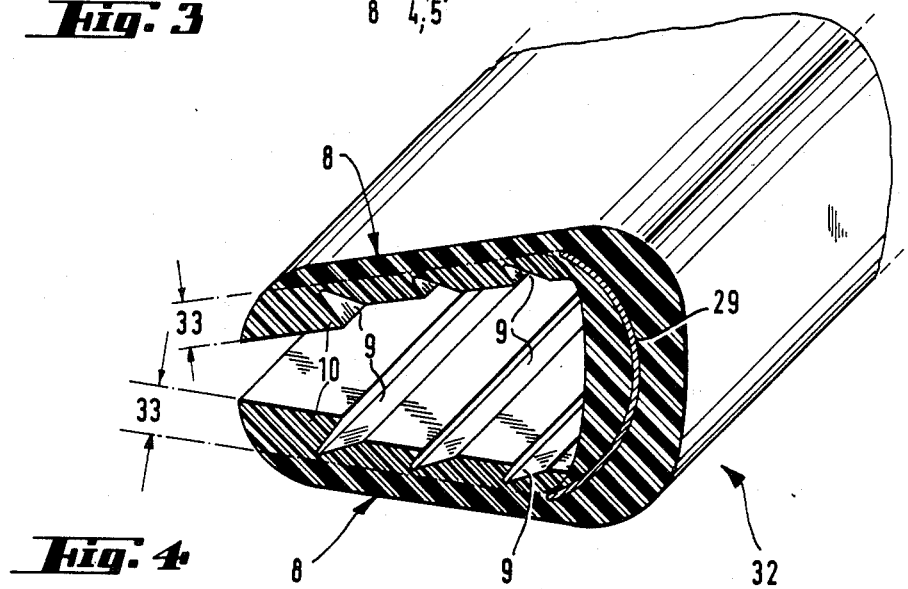
FIG. 4 shows a different embodiment of a profile strip formed according to this invention.

In the profile frame 32 illustrated in FIG. 4, the geometric form of the profile is once again comparable with the geometric form of the already described profile frames and strips. As a difference from the embodiments previously described, this profile frame 32 possesses different hardnesses in different regions. Thus, for example, the shore hardness in the profiled regions 33 is relatively high, in order to prevent deformation of the profiling and assure reliable and permanent anchoring to the profiled facing on the glass pane. The other, outer regions of the profile, in contrast, have a relatively low shore hardness, in order that the profile can easily fulfill its sealing function, for example with respect to an adjacent frame.

Figure 5:
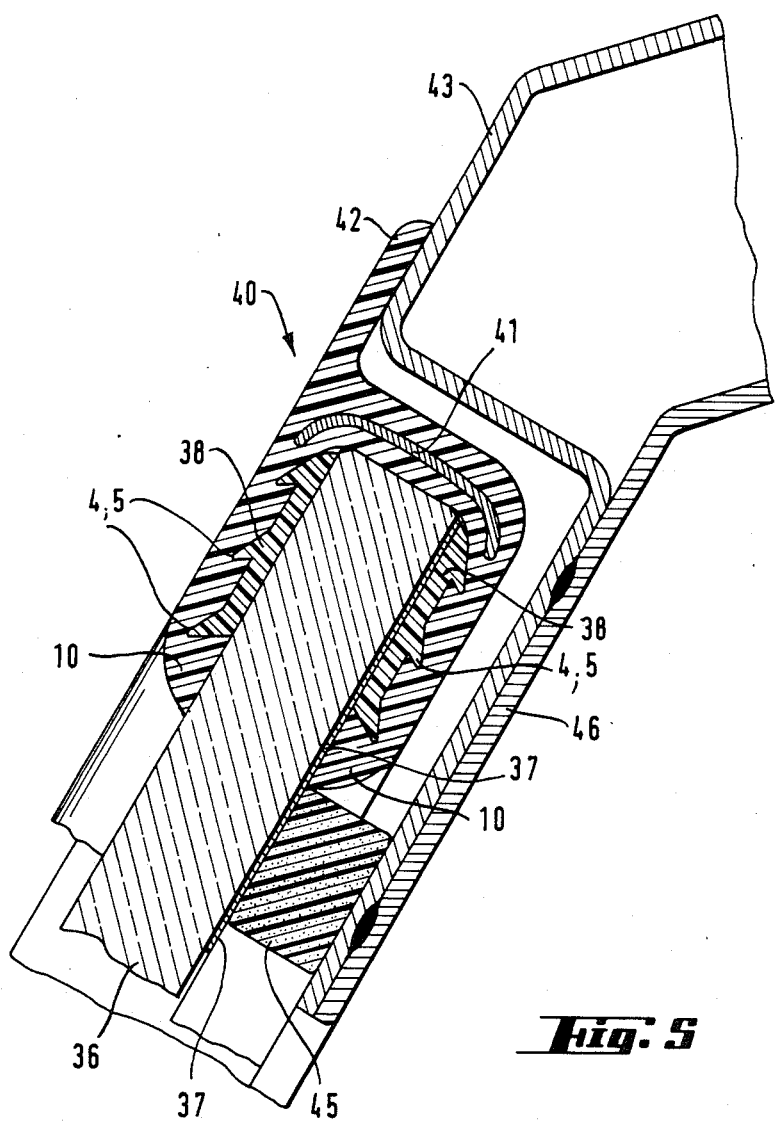
FIG. 5 shows an automobile glass pane glued to the window frame of an automobile body and having a profile frame constructed according to this invention.

In FIG. 5, an automobile glass pane, which is equipped with a modified embodiment of a profile frame, is shown in the installed condition. The glass pane 36, which may be a single-pane safety glass pane or a composite glass pane, is furnished on the side towards the interior of the vehicle with a frame-like coating 37 of a baked lacquer finish. On this coating 37 and on the opposite side of the glass pane, a profiled facing 38 having a sawtooth profile in cross-section is applied by bonding to each face. The profile frame 40, which for example is EPDM, is once again equipped internally with a profiling which cooperates with the profiling of the facing 38 in a form-fitting manner. To increase the required clamping force, a metal inlay 41 is embedded in the profile frame 40. The profile frame 40 is furnished with a sealing lip 42, which bears against the frame 43 of the automobile body surrounding the glass pane. The connecting of the glass pane 36 to the window frame of the body is effected by the adhesive strip 45, which is incorporated between the glass pane 36 and the mounting flange 46 of the window frame.

Figure 6:
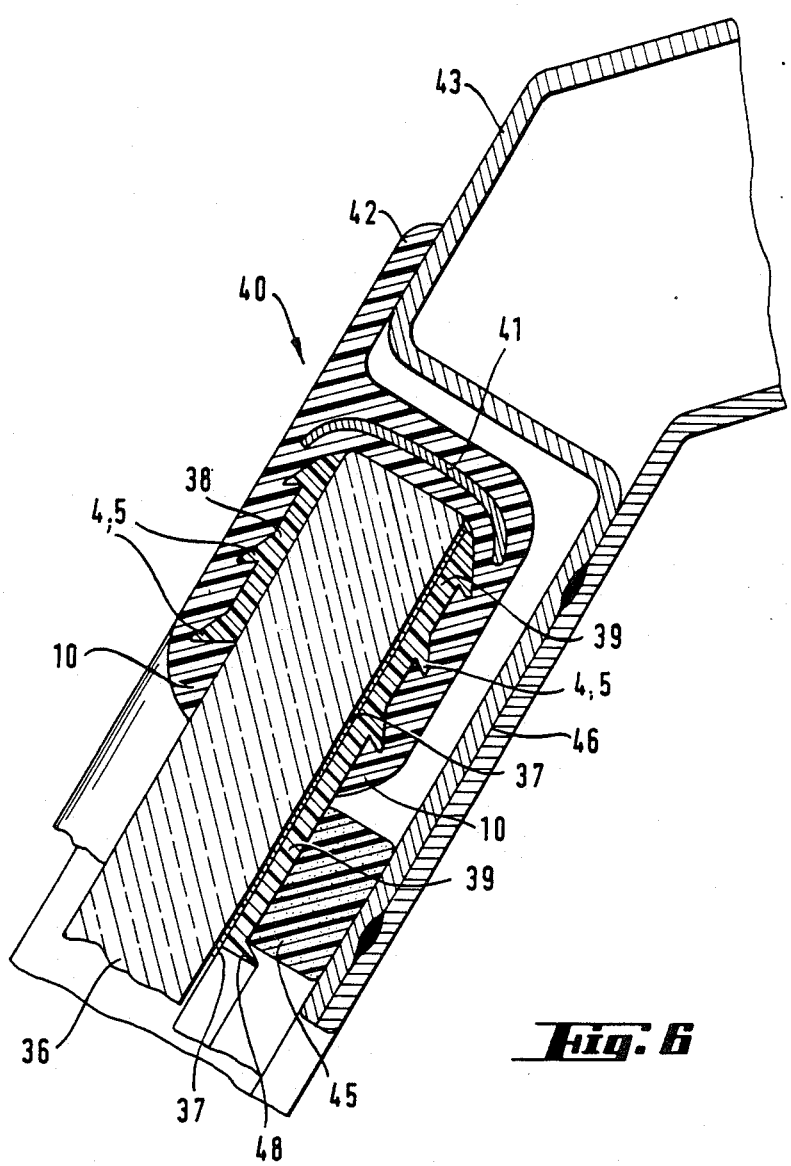
FIG. 6 shows a different embodiment of an automobile glass pane constructed according to this invention, bonded to the window frame of an automobile body.

The embodiment shown in FIG. 6 corresponds to the embodiment described with reference to FIG. 5 with the sole exception that the facing 39, applied onto the inner face of the glass pane on the light-opaque coating 37, has a sufficiently large width to extend beyond the adhesive strip 45. At this end, the facing 39 is furnished with a boundary rib 48. This boundary rib 48 has the task of preventing the adhesive compound of the adhesive strip 45 from being squeezed into the viewing field of the glass pane and thus becoming visible when the pane is pressed onto the mounting flange 46. The facing 39 can, in this case, be of the same moisture-hardening, single-component polyurethane as the adhesive strip 45. In this manner, a special pretreatment of the glass pane before installation becomes unnecessary, because the adhesive compound of the adhesive strip 45 bonds directly to the facing 37. A profiling of the facing 39 is, apart from the boundary rib 48, required only in the region cooperating with the web of the profile frame 40.

Obviously, numerous modifications and variations of the present invention are possible in light of the above teachings. It is therfore to be understood that within the scope of the appended claims, the invention may be practiced otherwise than as specifically described herein.

What is claimed as new and desired to be secured by Letters Patent of the United States is:

1. A glass pane assembly comprising:
   a glass pane having an edge region;
   a facing firmly adhering to at least one surface of said edge region of said glass pane, said facing having a profiled surface and being formed of a hardened extrudable plastic material; and
   a profile element formed of an elastomeric material having an inherent resiliency, and having a U-shaped clamping portion, said clamping portion having profiling positioned on an inner surface of at least one arm of said U-shape, said profiled surface and said profiling having complementary shapes so as to mate with one another when said profile element is mounted on said glass pane, whereby a form fitting connection which resists separation may be obtained between said clamping portion and said profiled facing by pushing said profile element on said glass pane.

2. Glass pane according to claim 1 wherein said profiled surface comprises at least one rib extending parallel to a glass pane edge and formed to approximately sawtooth shape in cross-section.

3. Glass pane according to claim 2 wherein said ribs form back-out zones against which corresponding projections of said profiling of said profile element respectively engage.

4. Glass pane according to claim 1 wherein said facing is formed of a polyurethane adhesive from the group consisting of a moisture-hardening, single-component polyurethane adhesive and a two-component polyurethane adhesive.

5. Glass pane according to claim 1 wherein said facing has a thickness of 0.5 to 2 mm and has a profile depth of 0.5 to 1.5 mm.

6. Glass pane according to claim 1 wherein said profile element is formed of a polymer.

7. Glass pane according to claim 6 wherein said profile element has a metal inlay which increases a clamping force of said clamping portion.

8. Glass pane according to claim 1 wherein said profile element comprises a profile frame furnished internally, on a central web thereof lying opposite to a peripheral surface of said glass pane with a recess for receiving a sealing compound.

9. Glass pane according to claim 1 wherein said profile element has a greater hardness in a region having said profiling than in the other regions thereof.

10. Glass pane according to claim 1 wherein said facing is extended towards a center of said glass pane, on the surface of said glass pane to be bonded with a mounting flange of a window frame of an automobile body, whereby an adhesive cord may be bonded to such extended facing.

11. Glass pane according to claim 6 wherein said polymer is EPDM.

* * * * *

UNITED STATES PATENT AND TRADEMARK OFFICE
CERTIFICATE OF CORRECTION

PATENT NO. : 4,775,570
DATED : October 4, 1988
INVENTOR(S) : OHLENFORST ET AL

It is certified that error appears in the above-identified patent and that said Letters Patent is hereby corrected as shown below:

Column 2, line 24, after "invention" insert --;--;

line 49, change "of" (first occurrence) to --or--.

Signed and Sealed this

Seventh Day of March, 1989

*Attest:*

DONALD J. QUIGG

*Attesting Officer*     *Commissioner of Patents and Trademarks*